(12) United States Patent
Healy et al.

(10) Patent No.: US 10,922,404 B2
(45) Date of Patent: *Feb. 16, 2021

(54) CHECKOUT SYSTEM EXECUTABLE CODE MONITORING, AND USER ACCOUNT COMPROMISE DETERMINATION SYSTEM

(71) Applicant: Palantir Technologies Inc., Denver, CO (US)

(72) Inventors: Adam Healy, Washington, DC (US); Benjamin Jackson, Washington, DC (US); Khoa Pham, New York, NY (US); Sanjay Paul, New York, NY (US); Zhi Qiang Liu, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,720

(22) Filed: Sep. 27, 2018

(65) Prior Publication Data

US 2019/0171814 A1 Jun. 6, 2019

Related U.S. Application Data

(63) Continuation of application No. 15/235,551, filed on Aug. 12, 2016, now Pat. No. 10,102,369.

(Continued)

(51) Int. Cl.
*G06F 21/55* (2013.01)
*G06Q 20/18* (2012.01)
(Continued)

(52) U.S. Cl.
CPC .......... *G06F 21/552* (2013.01); *G06Q 20/18* (2013.01); *G06Q 20/20* (2013.01); *G06Q 20/4016* (2013.01); *H04L 9/3236* (2013.01)

(58) Field of Classification Search
CPC ...... G06F 21/552; G06Q 20/20; G06Q 20/18; H04L 9/3236
(Continued)

(56) References Cited

U.S. PATENT DOCUMENTS 4,852,019 A 7/1989 Vinberg et al.
5,109,399 A 4/1992 Thompson
(Continued)

FOREIGN PATENT DOCUMENTS

CN 101729531 6/2010
CN 103281301 9/2013
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Mohammad W Reza
(74) *Attorney, Agent, or Firm* — Knobbe, Martens, Olson & Bear, LLP

(57) ABSTRACT

Methods, systems, and apparatus, including computer programs encoded on computer storage media, for a checkout system executable code monitoring, and user account compromise determination system. The system monitors executable code initiating and executing on checkout systems, including determining hashes of the executable code. The system determines whether the executable code is malicious based on the hash, and associated information of the executable code. Additionally, the system monitors user access to checkout systems, and determines user accounts associated with being compromised. User interfaces are generated describing checkout systems associated with a risk of being compromised, and are configured for user interaction, which cause generation of updated user interfaces and access to (Continued)

electronic data stores to determine information relevant to the user interaction.

20 Claims, 12 Drawing Sheets

Related U.S. Application Data

(60) Provisional application No. 62/207,328, filed on Aug. 19, 2015.

(51) Int. Cl.
*G06Q 20/40* (2012.01)
*G06Q 20/20* (2012.01)
*H04L 9/32* (2006.01)

(58) Field of Classification Search
USPC .......................................................... 726/23
See application file for complete search history.

(56) References Cited

U.S. PATENT DOCUMENTS

| | | |
|---|---|---|
| 5,136,690 A | 8/1992 | Becker et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,835,085 A | 11/1998 | Eick et al. |
| 5,845,300 A | 12/1998 | Comer |
| 6,057,757 A | 5/2000 | Arrowsmith et al. |
| 6,091,956 A | 7/2000 | Hollenberg |
| 6,108,698 A | 8/2000 | Tenev et al. |
| 6,161,098 A | 12/2000 | Wallman |
| 6,219,053 B1 | 4/2001 | Tachibana et al. |
| 6,226,789 B1 | 5/2001 | Tye et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,807,569 B1 | 10/2004 | Bhimani et al. |
| 6,828,920 B2 | 12/2004 | Owen et al. |
| 6,839,745 B1 | 1/2005 | Dingari et al. |
| 6,856,313 B2 | 2/2005 | Gossweiler, III et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,036,146 B1 | 4/2006 | Goldsmith |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,225,468 B2 | 5/2007 | Waisman et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,895,666 B1 | 2/2011 | Eshghi et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,239,668 B1 | 8/2012 | Chen et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,193 B1 | 10/2012 | Gardner et al. |
| 8,312,367 B2 | 11/2012 | Foster |
| 8,312,546 B2 | 11/2012 | Alme |
| 8,321,935 B1 | 11/2012 | Chen et al. |
| 8,341,745 B1 | 12/2012 | Chau et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |

(56) References Cited

U.S. PATENT DOCUMENTS

| | | |
|---|---|---|
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,621,634 B2 | 12/2013 | Turbin |
| 8,639,757 B1 | 1/2014 | Zang et al. |
| 8,646,080 B2 | 2/2014 | Williamson et al. |
| 8,683,322 B1 | 3/2014 | Cooper |
| 8,689,108 B1 | 4/2014 | Duffield et al. |
| 8,695,097 B1 | 4/2014 | Mathes et al. |
| 8,701,190 B1 | 4/2014 | Chau et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,806,625 B1 | 8/2014 | Berger |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,898,093 B1 | 11/2014 | Helmsen |
| 8,898,788 B1 | 11/2014 | Aziz et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,027,140 B1 | 5/2015 | Watkins et al. |
| 9,112,850 B1 | 8/2015 | Eisen |
| 9,244,679 B1 | 1/2016 | Arellano et al. |
| 9,311,479 B1 | 4/2016 | Manni et al. |
| 9,323,863 B2 | 4/2016 | Krajec et al. |
| 9,323,924 B1 | 4/2016 | Roundy et al. |
| 9,336,389 B1 | 5/2016 | Okereke et al. |
| 9,361,353 B1 | 6/2016 | Aristides |
| 9,367,687 B1 | 6/2016 | Warshenbrot |
| 9,413,721 B2 | 8/2016 | Morris et al. |
| 9,785,773 B2 | 10/2017 | Falk et al. |
| 10,102,369 B2 | 10/2018 | Healy et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0187932 A1 | 10/2003 | Kennedy |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0153418 A1 | 8/2004 | Hanweck |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0250124 A1 | 12/2004 | Chesla et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Di Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2006/0020599 A1 | 1/2006 | Martin et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294643 A1 | 12/2007 | Kyle |
| 2007/0294766 A1 | 12/2007 | Mir et al. |
| 2008/0016339 A1* | 1/2008 | Shukla .............. G06F 21/53 713/164 |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0229422 A1 | 9/2008 | Hudis et al. |
| 2008/0263468 A1 | 10/2008 | Cappione et al. |
| 2008/0263669 A1 | 10/2008 | Alme |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0103442 A1 | 4/2009 | Douville |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |

(56) References Cited

U.S. PATENT DOCUMENTS

| | | |
|---|---|---|
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0216867 A1 | 8/2009 | Pusateri et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0271504 A1 | 10/2009 | Ginter et al. |
| 2009/0281839 A1 | 11/2009 | Lynn et al. |
| 2009/0282483 A1 | 11/2009 | Bennett |
| 2009/0285483 A1 | 11/2009 | Guven et al. |
| 2009/0287470 A1 | 11/2009 | Farnsworth et al. |
| 2009/0292626 A1 | 11/2009 | Oxford |
| 2009/0313267 A1 | 12/2009 | Girgensohn et al. |
| 2009/0328222 A1 | 12/2009 | Helman et al. |
| 2010/0011282 A1 | 1/2010 | Dollard et al. |
| 2010/0014432 A1 | 1/2010 | Durfee et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0077481 A1 | 3/2010 | Polyakov et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0287084 A1 | 11/2010 | Roberts et al. |
| 2010/0293174 A1 | 11/2010 | Bennett et al. |
| 2010/0306713 A1 | 12/2010 | Geisner et al. |
| 2010/0313157 A1 | 12/2010 | Carlsson et al. |
| 2010/0321399 A1 | 12/2010 | Ellren et al. |
| 2010/0323829 A1 | 12/2010 | Cross et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0047620 A1 | 2/2011 | Mahaffey et al. |
| 2011/0060753 A1 | 3/2011 | Shaked |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0107424 A1 | 5/2011 | Singh et al. |
| 2011/0117878 A1 | 5/2011 | Barash et al. |
| 2011/0119100 A1 | 5/2011 | Ruhl et al. |
| 2011/0131123 A1* | 6/2011 | Griffin .......... G06Q 40/00 705/35 |
| 2011/0137766 A1 | 6/2011 | Rasmussen et al. |
| 2011/0145286 A1 | 6/2011 | LaRowe et al. |
| 2011/0145920 A1 | 6/2011 | Mahaffey et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167491 A1 | 7/2011 | Ruggerio |
| 2011/0170799 A1 | 7/2011 | Carrino et al. |
| 2011/0173032 A1 | 7/2011 | Payne et al. |
| 2011/0191849 A1* | 8/2011 | Jayaraman .......... H04L 63/1416 726/23 |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0002839 A1 | 1/2012 | Niemela et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0079596 A1 | 3/2012 | Thomas et al. |
| 2012/0084866 A1 | 4/2012 | Stolfo |
| 2012/0106801 A1 | 5/2012 | Jackson |
| 2012/0109821 A1 | 5/2012 | Barbour et al. |
| 2012/0110633 A1 | 5/2012 | An et al. |
| 2012/0110674 A1 | 5/2012 | Belani et al. |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0290879 A1 | 11/2012 | Shibuya et al. |
| 2012/0293542 A1 | 11/2012 | Iwama et al. |
| 2012/0296907 A1 | 11/2012 | Long et al. |
| 2012/0296924 A1 | 11/2012 | Iwama et al. |
| 2012/0304244 A1 | 11/2012 | Xie et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006725 A1 | 1/2013 | Simanek et al. |
| 2013/0019306 A1 | 1/2013 | Lagar-Cavilla et al. |
| 2013/0046842 A1 | 2/2013 | Muntz et al. |
| 2013/0055338 A1 | 2/2013 | McDougal et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0073568 A1 | 3/2013 | Federov et al. |
| 2013/0078943 A1 | 3/2013 | Biage et al. |
| 2013/0097482 A1 | 4/2013 | Marantz et al. |
| 2013/0097706 A1 | 4/2013 | Titonis et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0139260 A1 | 5/2013 | McDougal |
| 2013/0139268 A1 | 5/2013 | An et al. |
| 2013/0145470 A1 | 6/2013 | Richard et al. |
| 2013/0150004 A1 | 6/2013 | Rosen |
| 2013/0151148 A1 | 6/2013 | Parundekar et al. |
| 2013/0151517 A1 | 6/2013 | Cheong et al. |
| 2013/0152202 A1 | 6/2013 | Pak et al. |
| 2013/0157234 A1 | 6/2013 | Gulli et al. |
| 2013/0176321 A1 | 7/2013 | Mitchell et al. |
| 2013/0179420 A1 | 7/2013 | Park et al. |
| 2013/0218899 A1 | 8/2013 | Raghavan et al. |
| 2013/0224696 A1 | 8/2013 | Wolfe et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |

(56) References Cited

U.S. PATENT DOCUMENTS

| | | |
|---|---|---|
| 2013/0263019 A1 | 10/2013 | Castellanos et al. |
| 2013/0268520 A1 | 10/2013 | Fisher et al. |
| 2013/0276117 A1 | 10/2013 | Hwang |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0033010 A1 | 1/2014 | Richardt et al. |
| 2014/0040371 A1 | 2/2014 | Gurevich et al. |
| 2014/0046832 A1 | 2/2014 | Rosen et al. |
| 2014/0046982 A1 | 2/2014 | Chan et al. |
| 2014/0047357 A1 | 2/2014 | Alfaro et al. |
| 2014/0058946 A1 | 2/2014 | Paranjape |
| 2014/0059038 A1 | 2/2014 | McPherson et al. |
| 2014/0059683 A1 | 2/2014 | Ashley |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0172914 A1 | 6/2014 | Elnikety et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214668 A1* | 7/2014 | Lotter .................. H04L 63/20 705/41 |
| 2014/0245443 A1 | 8/2014 | Chakraborty |
| 2014/0267294 A1 | 9/2014 | Ma |
| 2014/0267295 A1 | 9/2014 | Sharma |
| 2014/0279824 A1 | 9/2014 | Tamayo |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0351261 A1 | 11/2014 | Aswani et al. |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0096024 A1 | 4/2015 | Haq et al. |
| 2015/0100605 A1 | 4/2015 | Golden et al. |
| 2015/0127478 A1 | 5/2015 | Westby et al. |
| 2016/0063106 A1 | 3/2016 | Chai et al. |
| 2016/0226914 A1 | 8/2016 | Doddy et al. |
| 2016/0300216 A1 | 10/2016 | Godsey et al. |
| 2017/0053115 A1 | 2/2017 | Healy et al. |
| 2018/0046801 A1 | 2/2018 | Falk et al. |

FOREIGN PATENT DOCUMENTS

| | | | |
|---|---|---|---|
| DE | 102014103482 | | 9/2014 |
| DE | 102014215621 | | 2/2015 |
| EP | 1672527 | | 6/2006 |
| EP | 2551799 | | 1/2013 |
| EP | 2778977 | | 9/2014 |
| EP | 2835745 | | 2/2015 |
| EP | 2835770 | | 2/2015 |
| EP | 2838039 | | 2/2015 |
| EP | 2846241 | | 3/2015 |
| EP | 2851852 | | 3/2015 |
| EP | 2858014 | | 4/2015 |
| EP | 2858018 | | 4/2015 |
| EP | 2963578 | | 1/2016 |
| EP | 3133523 | | 2/2017 |
| GB | 2379045 A | * | 2/2003 ........... G06Q 20/405 |
| GB | 2516155 | | 1/2015 |
| GB | 2518745 | | 4/2015 |
| NL | 2012778 | | 11/2014 |
| NL | 2013306 | | 2/2015 |
| WO | WO 2000/009529 | | 2/2000 |
| WO | WO 2005/104736 | | 11/2005 |
| WO | WO 2009/061501 | | 5/2009 |
| WO | WO 2010/000014 | | 1/2010 |
| WO | WO 2010/030913 | | 3/2010 |
| WO | WO 2013/010157 | | 1/2013 |
| WO | WO 2013/102892 | | 7/2013 |

OTHER PUBLICATIONS

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Baker et al., "The Development of a Common Enumeration of Vulnerabilities and Exposures," Presented at the Second International Workshop on Recent Advances in Intrusion Detection, Sep. 7-9, 1999, pp. 35.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Crosby et al., "Efficient Data Structures for Tamper-Evident Logging," Department of Computer Science, Rice University, 2009, pp. 17.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

"The FASTA Program Package," fasta-36.3.4, Mar. 25, 2011, pp. 29.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.

Glaab et al., "EnrichNet: Network-Based Gene Set Enrichment Analysis," Bioinformatics 28.18 (2012): pp. i451-i457.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Hansen et al., "Analyzing Social Media Networks with NodeXL: Insights from a Connected World", Chapter 4, pp. 53-67 and Chapter 10, pp. 143-164, published Sep. 2010.

(56) References Cited

OTHER PUBLICATIONS

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kim et al., "The Design and Implementation of Tripwire: A File System Integrity Checker," 2nd ACM Conference on Computer and Communications Security, Nov. 2, 1994, pp. 18-29.
Kitts, Paul, "Chapter 14: Genome Assembly and Annotation Process," The NCBI Handbook, Oct. 2002, pp. 1-21.
Lee et al., "A Data Mining and CIDF Based Approach for Detecting Novel and Distributed Intrusions," Lecture Notes in Computer Science, vol. 1907 Nov. 11, 2000, pp. 49-65.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
VirusTotal—About, <http://www.virustotal.com/en/about/> Printed Jun. 30, 2014 in 8 pages.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues", A129, pp. 859-864, 2001.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/668,833 dated Aug. 15, 2016.
Notice of Allowance for U.S. Appl. No. 14/668,833 dated Jun. 7, 2017.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14199182.8 dated Mar. 13, 2015.
Official Communication for European Patent Application No. 15175106.2 dated Nov. 5, 2015.

(56) References Cited

OTHER PUBLICATIONS

Official Communication for European Patent Application No. 16184974.0 dated Jan. 2, 2017.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communciation for Great Britain Patent Application No. 1411984.6 dated Dec. 22, 2014.
Official Communication for Great Britain Patent Application No. 1413935.6 dated Jan. 27, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/831,791 dated Mar. 4, 2015.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/280,490 dated Jul. 24, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,599 dated Jul. 22, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated Sep. 9, 2014.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/486,991 dated Mar. 10, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/668,833 dated Jan. 23, 2017.
Notice of Allowance for U.S. Appl. No. 15/235,551 dated Jun. 8, 2018.
Official Communication for European Patent Application No. 15175106.2 dated Oct. 9, 2018.
Official Communication for U.S. Appl. No. 15/235,551 dated Aug. 16, 2017.
Official Communication for U.S. Appl. No. 15/235,551 dated Jan. 18, 2018.
Official Communication for U.S. Appl. No. 15/235,551 dated Nov. 2, 2016.
Official Communication for U.S. Appl. No. 15/235,551 dated Jan. 30, 2017.
Official Communication for U.S. Appl. No. 15/235,551 dated May 4, 2017.
Official Communication for U.S. Appl. No. 15/726,917 dated Sep. 13, 2018.
Official Communication for European Patent Application No. 16184974.0 dated May 7, 2019.

* cited by examiner

INSIGHT PORTAL

OVERVIEW SCO/MCX USER SYSTEM NETWORK

SUMMARY TRANSACTIONS PROCESS ALERTS USER ALERTS

SEARCH | USER, HOST OR HASH |

| MD5 | 1D9B64DC0A5221247208F8XXXX12345 | VIRUS TOTAL | SEARCH HASH ON VIRUS TOTAL |
| SHA1 | _704_ | PHOENIX | SEARCH IN PHOENIX |
| FILENAME | _702_ EXAMPLE.EXE | | |
| RISK LEVEL | _706_ CRITICAL | | |

ALERT REVIEWER _708_

ALERT STATUS

HOST NAME ACTION NEWS..

DATE ACTIONED

NOTES HOSTNAME

| BENIGN ▼ | | ACTION _718_ |

| _710_ | _712_ | _714_ | _716_ | |
| TOTAL HITS | UNIQ SCOS AFFECTED | UNIQ FILO LOCATIONS | DIFFERENT REGIONS SEEN | TOTAL UNIQUE DAYS IN ENVIRONMENT |
| 11 | 1 | 1 | 1 | 25 |
| | | | | FROM 2015-03-21 TO 2015-05-17 |

_720_ DETAILS SELECT A CARD ABOVE TO VIEW ITS DETAILS CSV EXPO

FIG. 7

INSIGHT PORTAL

OVERVIEW | SCO/MCX | USE | SYSTEM | NETWORK | SEARCH [User,host or hash]
SUMMARY | TRANSACTIONS | PROCESS ALERTS | USER ALERTS

ALERTS FROM [1 May 2015] TO [1 June 2015]

2015-05-01  2015-05-05  2015-05-09  2015-05-13  2015-05-17  2015-05-21  2015-05-25  2015-05-29

USER ALERT - 474 UNIQUE USERS
902 — 904 — 906 — 908 — FILTER BY TRIAGE STATUS [ALL ▽]
910 — 912

| Alert | Username | Host Name | Type of Alert | Status | Time Reviewed | Day of Alert | Historical Fail Max | Hist |
|---|---|---|---|---|---|---|---|---|
| 174103 | FSTEST | SC0 | NewUserInSecure | | | 2015-05-03 | 0 | 0 |
| 174104 | FSTEST | HCX | NewUserInSecure | | | 2015-05-01 | 0 | 0 |
| 174130 | FSTEST | HCX0 | NewUserInSecure | | | 2015-05-01 | 0 | 0 |
| 174131 | FSTEST | HCX0 | NewUserInSecure | | | 2015-05-01 | 0 | 0 |
| 174132 | FSTEST | HCX0 | NewUserInSecure | | | 2015-05-01 | 0 | 0 |
| 174133 | ata | SC052 | NewUserInSecure | | | 2015-05-01 | 0 | 0 |
| 174134 | atv | SC043SNS | NewUserInSecure | | | 2015-05-01 | 0 | 0 |
| 174135 | FS | HCX | NewUserInSecure | | | 2015-05-01 | 0 | 0 |
| 174136 | chh | SC0 | NewUserSuccessMax | | | 2015-05-01 | 1 | 16 |
| 174137 | ebe | SC0 | NewUserSuccessMax | | | 2015-05-01 | 7 | 9 |

Showing 1 to 10 of 939 entries  Previous [1] 2 3 4 5 .. 94 Next

[EXPORT USER ALERTS]

FIG.9

CHECKOUT SYSTEM EXECUTABLE CODE MONITORING, AND USER ACCOUNT COMPROMISE DETERMINATION SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Self-checkout systems have gained prominence in businesses (e.g., supermarkets, drug stores, etc.) as a way to reduce labor costs and provide consumers with differing methods of paying for products. The self-checkout systems can include a computing system configured to identify products (e.g., a bar code scanner), and process payment instruments (e.g., cash or credit card of a consumer). Self-checkout systems can be accessed by a system administrator to install software on the computing system (e.g., a privileged administrator user account), and the self-checkout system can be in communication with one or more server systems (e.g., controlled by a business which includes the self-checkout system, or an intermediary company associated with the business) over a network (e.g., the Internet).

SUMMARY

Checkout systems utilized by businesses are clear targets for malicious activity. Checkout systems process sensitive information (e.g., payment information), and thus have access to sensitive information of each consumer that utilizes a checkout system. In a large business, such as a national or global supermarket, the business might use tens, or even hundreds, of thousands of checkout systems. Determining whether a single checkout system is executing malicious code, or whether user accounts have been compromised by a malicious actor, creates a massive technical hurdle. Previously, businesses would purchase checkout systems from manufacturers, and rely on the checkout systems being securely locked down. However, once businesses introduce checkout systems for use by consumers, they have little way of knowing whether the checkout systems are being subsequently tampered with, or whether user accounts with access to them are being compromised. By monitoring execution of code on each checkout system, including performing cryptographic hashes of unknown code, a system described below can identify checkout systems as being compromised. Furthermore, the system can determine whether user accounts that can access checkout systems have been compromised, by monitoring specific actions performed by user accounts. Through examining executable code and user account behavior, the system improves network security, and guards against checkout systems performing malicious actions.

Particular embodiments of the subject matter described in this specification can be implemented so as to realize one or more of the following advantages. A system can quickly identify whether any checkout systems utilized in a business have been compromised by an attacker, and enable quickly stopping the attacker from obtaining further sensitive information (e.g., credit card numbers) of consumers. The system can compare processes executing in memory of the checkout systems to known valid processes, and determine whether unknown processes, or processes known to be malicious, are executing on the checkout systems. Additionally, the system can determine that checkout systems have been accessed by user accounts in suspicious or risky manners, and quickly flag (e.g., identify for review) the checkout systems and user accounts. In this way, the system can provide quick insights (e.g., to a user) into hundreds, thousands, millions, of checkout systems in use by a business. Furthermore, the system can obtain transaction data and quickly identify sensitive information (e.g., credit card numbers) that might have been improperly obtained by a malicious actor (e.g., by determining compromised checkout machines and obtaining transaction data from the compromised checkout machines). In this way, a business can quickly identify compromised sensitive information, and alert the affected consumers.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In general, one innovative aspect of the subject matter described in this specification can be embodied in methods that include the actions of obtaining checkout system data from a plurality of checkout systems associated with a business, wherein the checkout system data identifies processes executing in memory of each checkout system, and user account access information indicating user account access attempts; determining whether the checkout system data identifies processes, executing in memory of one or more checkout systems, that are not known to be valid; determining, using the user account access information, anomalous user behavior of user accounts; generate user interface data describing the processes not known to be valid and anomalous user behavior; and provide at least a portion of the generated user interface data for presentation on a user device.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 illustrates an example user interface displayed upon selection of a particular process not known to be valid.

FIG. 9 illustrates an example user interface identifying user accounts and associated alerts identifying anomalous user behavior.

Like reference numbers and designations in the various drawings indicate like elements.

DETAILED DESCRIPTION

Figure 1:
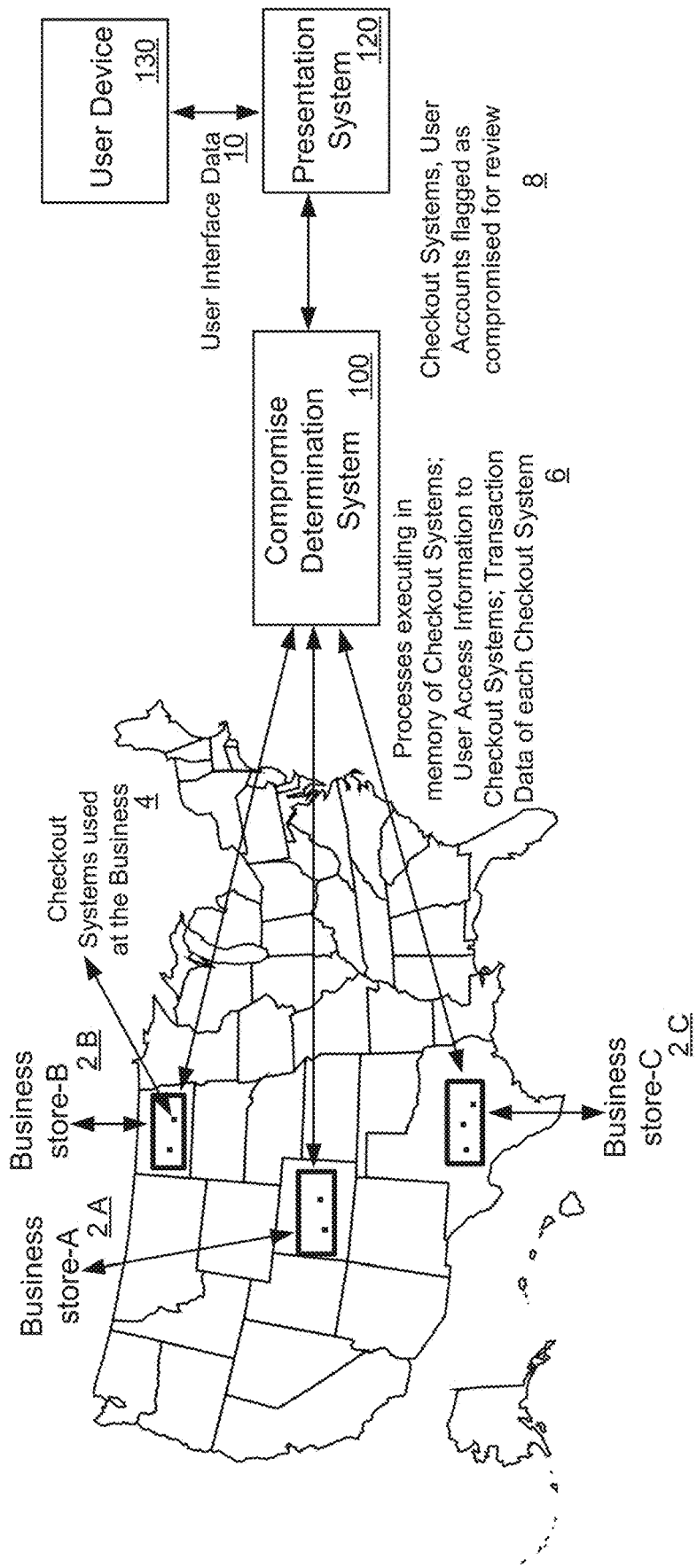
FIG. 1 illustrates a block diagram of checkout systems in communication with a compromise determination system.

When purchasing products, or other goods, at a business, consumers can pay for the products using payment instruments such as credit cards. During processing of payment cards, checkout systems obtain sensitive payment information (e.g., credit card numbers), and provide the sensitive information to an outside system (e.g., a credit card company). A malicious actor can initiate a process to execute in memory of a checkout system that can obtain the sensitive payment information, and later relay the information to a system controlled by the malicious actor. In this way, payment information can be 'skimmed', that is, obtained from checkout systems causing a data breach and loss of trust by consumers of the business.

This specification describes a compromise determination system that can obtain information from checkout systems (e.g., processes executing on each checkout system, user account access information, and so on), and determine whether one or more of the checkout systems have been compromised by a malicious actor. In this specification, a checkout system is any system that receives payment information from a consumer (e.g. credit card information, cash, electronic payment through BLUETOOTH, Near Field Communications (NFC), Wi-Fi, and so on). A checkout system can include a self-checkout system, a checkout system configured to be operated in part by an employee of a business, a Point of Sale (POS) system, a system associated with Merchant Exchange, and so on. A process executing in memory includes any executable code (e.g., binaries) executing, or resident, in a memory (e.g., non-volatile, volatile memory) included in or accessible by a checkout system.

The compromise determination system can compare information describing processes executing in memory of checkout systems to known valid processes (e.g., processes associated with a business or a company that manufactures the checkout systems) to determine whether one or more checkout systems are executing unknown, or malicious, processes. Information describing a process can include a name of the process, a file path of the process, and/or a hash of the process (e.g., using cryptographic hash functions, such as MD5, SHA-2 or SHA-3). Upon a positive determination, the compromise determination system can provide information identifying the checkout systems for presentation to a user (e.g., for review by the user).

The compromise determination system can also determine anomalous user behavior associated with checkout systems, and provide information identifying the affected checkout systems and user accounts for presentation to a user. In this specification, anomalous user behavior is any behavior associated with a user account that is indicative of a risk of compromise of the user account. For instance, the compromise determination system can identify user accounts with privileged rights (e.g., administrator rights) that have never accessed checkout systems, and suddenly are accessing one or more checkout systems. Additionally, the compromise determination system can identify user accounts with privileged rights that normally access checkout systems in a particular geographic region, and are now accessing checkout systems in a different geographic region. Determining anomalous user behavior will be further described below, with reference to FIG. 4.

Through analyzing processes executing in memory of checkout systems, and determining anomalous user behavior, the compromise determination system can quickly provide insights into the safety of checkout systems associated with a business (e.g., determine whether any checkout systems have been compromised).

As will be described below, the compromise determination system can generate, or provide information to a presentation system that generates, user interfaces for display to a user (e.g., a Chief Security Officer, or persons at a business responsible for network and/or consumer security such as a system administrator) for review. The user can view flagged (e.g., highlighted or otherwise identified) checkout systems and/or user accounts that should be reviewed by the user (e.g., to determine whether they have been compromised). Upon selection of a particular flagged checkout system, the user can view data identifying, for instance, unknown, or known to be malicious, processes executing on the selected checkout system. Upon selection of a particular flagged user account, the user can view information associated with the user account (e.g., name of a person associated with the user account, role of the person, other user accounts accessed by the selected user account; checkout systems accessed by the selected user account), and quickly determine whether the selected user account has been compromised. Example user interfaces are described below, with reference to FIGS. 5-12. In this specification, user interface data can include any data (e.g., executable code, interpretable code, images, video, and so on), that can be utilized to generate user interfaces. For instance, user interface data can include code defining a web page (e.g., HTML, XML, and so on), which a user device can receive and process (e.g., render) to display the web page.

FIG. 1 illustrates a block diagram of checkout systems 4 in communication with a compromise determination system 100. The checkout systems 4 are included in different stores (e.g., Business stores A-C 2A-2C) of a particular business (e.g., a retailer, a drug store, a supermarket, and so on) across a geographic area (e.g., the United States).

The compromise determination system 100 can obtain checkout system data 6 from each checkout system 4 utilized by the business, which can include information describing processes executing in memory of each checkout system, user account access information (e.g., information obtained from security logs, active directory logs, information included in Access Control Lists, Group Memberships, and so on, describing user access attempts, actual user access, user access rights and so on), and transaction data (e.g., encrypted transaction data identifying payment instruments utilized by consumers). In some implementations, the compromise determination system 100 can be in communication with a system that aggregates information from checkout systems, and provides the aggregated information to the compromise determination system 100 (e.g., at particular intervals of time). Additionally, in some implementations user account access information can be obtained from outside systems including domain controllers, virtual private network (VPN) logs, and so on.

Upon receipt of the checkout system data 6, the compromise determination system 100 can determine whether any of the checkout systems 4 are executing processes not known to be valid, and thus potentially malicious. To effect this determination, the compromise determination system 100 can access information describing valid processes (e.g., processes included in the checkout system to execute by a manufacturer, processes initiated by a business, or processes otherwise identified as valid), and compare the valid processes to the processes received from the checkout systems 4. As will be described below, with reference to FIG. 3, the compromise determination system 100 can compare names of the processes, file paths of the processes (e.g., locations in each checkout systems' file system that store executable code associated with the processes), and/or hashes of the processes (e.g., cryptographic hashes of executable code associated with the processes).

Furthermore, upon receipt of the checkout system data 6, the compromise determination system 100 can determine anomalous user behavior associated with any of the checkout systems 4. As will be described below, with reference to FIG. 4, the compromise determination system 100 can identify (e.g., for presentation to a user) user accounts associated with behavior indicative of a risk of compromise.

In some implementations, the compromise determination system 100 can also receive transaction data from each checkout system 4, describing specific transactions made by consumers along with respective payment instrument (e.g., credit cards). As will be described below, with reference to FIGS. 11-12, a reviewing user (e.g., a system administrator) can identify checkout systems as being compromised, and then, using the transaction data, alert consumers that made use of the checkout system of possible malicious activity. When reference is made to personal information (e.g., identifications of consumers, payment instruments, and so on) being received and/or stored, all personal information can be encrypted for later review by only authorized users, and/or personal data can be anonymized.

After the compromise determination system 100 determines checkout systems and user accounts to be reviewed by a user (e.g., a system administrator), the compromise determination system 100 can provide identifications 8 of the determined checkout systems and user accounts to a presentation system 120 (e.g., in communication with a user device 130).

The presentation system 120 can generate user interface data that identifies checkout system and user accounts to be reviewed by a user. The user interfaces can include information relevant to determining whether the identified checkout system and user accounts have been compromised. For instance, the user interfaces can include a list of running unknown processes on a checkout system, along with identifications of other checkout systems that are also running each process, a time of when the process started, a user account that initiated execution of the process, a reference to a user interface with information describing the user account, all user accounts that have accessed or attempted to access the checkout system, and so on. User interfaces are described more fully below, with references to FIGS. 5-12. In this way, a reviewing user (e.g., a system administrator) can have immediate access to all information relevant to determining whether a user account or checkout system has been compromised.

Figure 2:
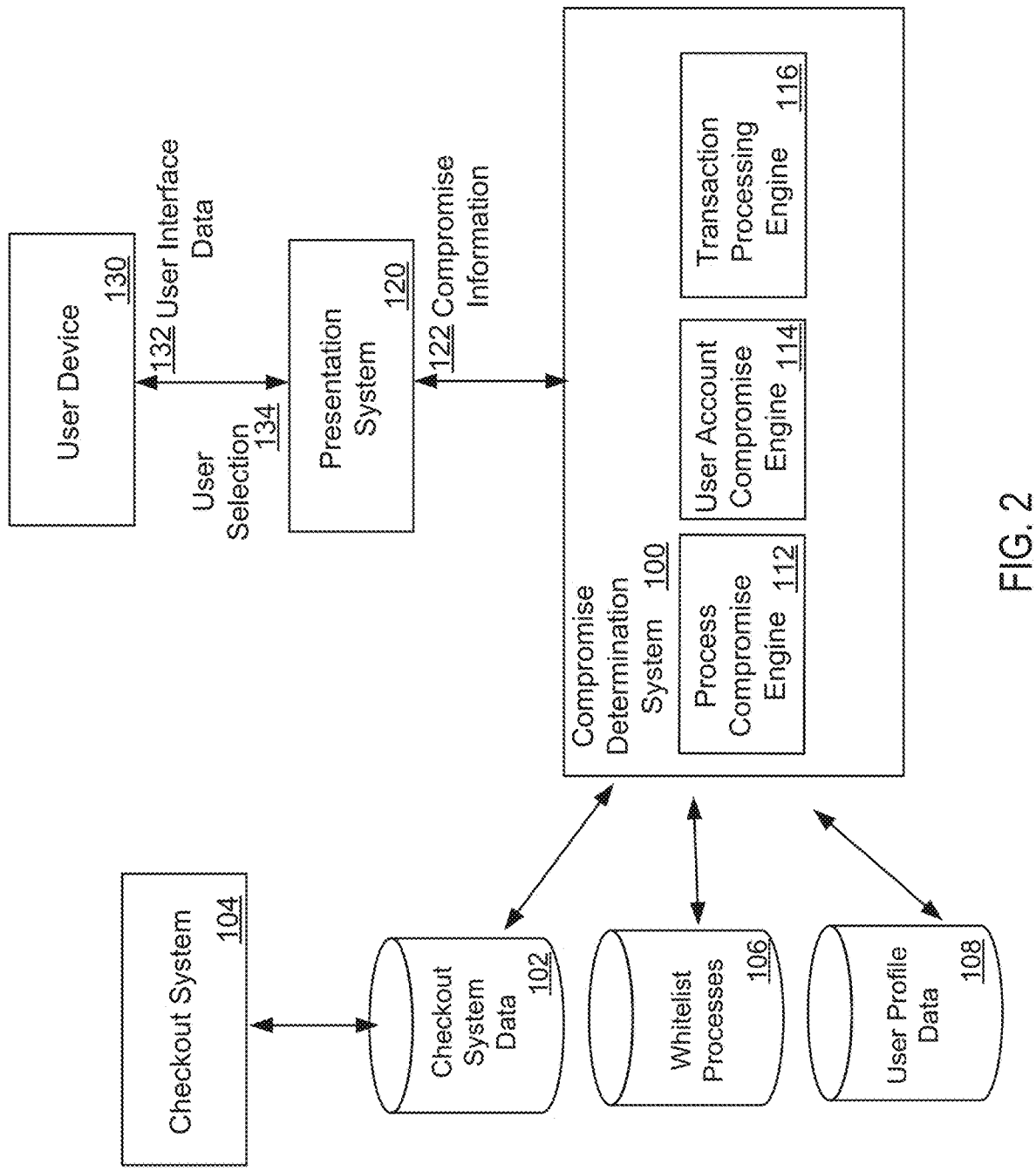
FIG. 2 illustrates a block diagram of an example compromise determination system.

FIG. 2 illustrates a block diagram of an example compromise determination system 100. The compromise determination system 100 can be a system of one or more computers, or one or more virtual machines executing on a system of one or more computers. The compromise determination system 100 receives checkout system data associated with checkout systems (e.g., checkout system 104), including information describing processes executing on each checkout system and user account access information of each checkout system, and determines checkout systems or user accounts that are to be reviewed by a user (e.g., a system administrator on user device 130). A user device can include a computer (e.g., a system of one or more processors), a laptop, a tablet, a mobile device, a wearable computer, and so on.

The compromise determination system 100 includes a process compromise engine 112 that maintains, or is in communication with, a checkout system database 102 storing checkout system data obtained from checkout systems 104 deployed by one or more businesses. In some implementations, the compromise determination system 100 can communicate with each checkout system and provide a request for checkout system data. In some implementations, each checkout system can include an agent (e.g., a software agent executing on the checkout system) that can provide information to the compromise determination system 100, or an outside system that aggregates information and provides the aggregated information to the compromise determination system 100 for storage in the checkout system database 102. Checkout system data can include names of executing processes, locations in checkout systems that store the processes, hashes of the processes (e.g., a cryptographic hash), user accounts that initiated the processes, times of initiation of the processes, and so on.

The process compromise engine 112 can access the checkout system database 102, and compare the information describing processes executing on checkout systems to information stored in a whitelist processes database 106, which the compromise determination system maintains or is in communication with. The whitelist processes database 106 stores information describing processes known to be valid (e.g., not malicious or otherwise approved). For instance, the whitelist processes database 106 can include information describing processes that were included to execute on checkout systems from a manufacturer of the checkout systems, from a business associated with the installed checkout systems, from authorized (e.g., privileged) users associated with the business, and so on.

The process compromise engine 112 can compare the processes executing on checkout systems (e.g., using the checkout system database 102) to the processes known to be valid (e.g., using the whitelist processes database 106). Comparing can include comparing a name of a process executing on a checkout system to all the names included in the whitelist processes. Similarly, comparing can include comparing file locations, and comparing hashes of executable code associated with the processes.

Upon determining, by the process compromise engine 112, that a particular process executing on a particular checkout system is not known to be valid, the process compromise engine 112 can store information that flags (e.g., identifies) that particular checkout system and particular process for later review (e.g., by a system administrator). Additionally, in some implementations the process compromise engine 112 can scan through the checkout system database 102 to identify processes executing on other checkout systems that match with the particular process (e.g., match names or other identifiers, match file locations, match hashes), and upon identification of other processes, the process compromise engine 112 can similarly flag (e.g., identify) the checkout systems for later review.

The compromise determination system 100 includes a user account compromise engine 114 that obtains information from the checkout system database 102 identifying user account access information (e.g., the checkout system database 102 stores security logs, active directory logs obtained from the checkout systems). The user account compromise engine 114 further obtains information from a user profile database 108, which the compromise determination system 100 maintains, or in some implementations is in communication with. The user profile database 108 stores user account information associated with the checkout systems (e.g., user accounts that can access one or more checkout systems, or that can access systems configured to generate or create user accounts that can access one or more checkout systems). The information can include, for each user account, an identification of a name of a person associated with the user account, user accounts that the user account has transitioned to (e.g., a user can log-in with the user account, transfer to a second user account and so on), and so on.

The user account compromise engine 114 can determine whether user accounts are exhibiting anomalous user behavior. As described above, anomalous user behavior is any behavior associated with a user account that is indicative of a risk of compromise of the user account. In some implementations, the user account compromise engine 114 can generate alerts to associate with user accounts, and affected checkout systems, that are exhibiting anomalous user behavior, with each alert associated with a specific type of anomalous user behavior. For instance, an alert can identify that a user account is accessing a checkout system (e.g., with privileged administrator rights) that the user account has never accessed before. An alert can identify that a user account known to access checkout systems in a particular geographic region (e.g., country, state, city) has accessed one or more checkout systems outside of that geographic region. Similarly, an alert can identify that a user account which normally logs into checkout systems over a network (e.g., the Internet) from a particular geographic region (e.g., country) has logged into a checkout system from a different region (e.g., a different country). An alert can identify that a user account with privileged rights (e.g., administrator rights) has suddenly begun logging into a greater than average, or other measure of central tendency, amount of checkouts systems. Determining anomalous user behavior is described below, with reference to FIG. 4.

The compromise determination system 100 includes a transaction processing engine 116 in communication with the checkout system database 102 which further stores transaction data from the checkout systems (e.g., checkout system 104). Transaction data includes, at least, information describing payment instruments (e.g., credit cards) utilized in transactions that occurred through use of each checkout system, and can include credit card numbers, expiration dates, card verification values (CVV), and so on. The transaction data can be encrypted with appropriate security measures (e.g., encrypted with the Advanced Encryption Standard, and so on).

The transaction processing engine 116 can utilize the transaction data to store information describing payment instruments and checkout systems in which the payment instruments were utilized. In this way, a user (e.g., a system administrator) can determine which payment instruments are potentially compromised if a checkout system is determined to be compromised (e.g., a malicious process executing on it).

Figure 5:
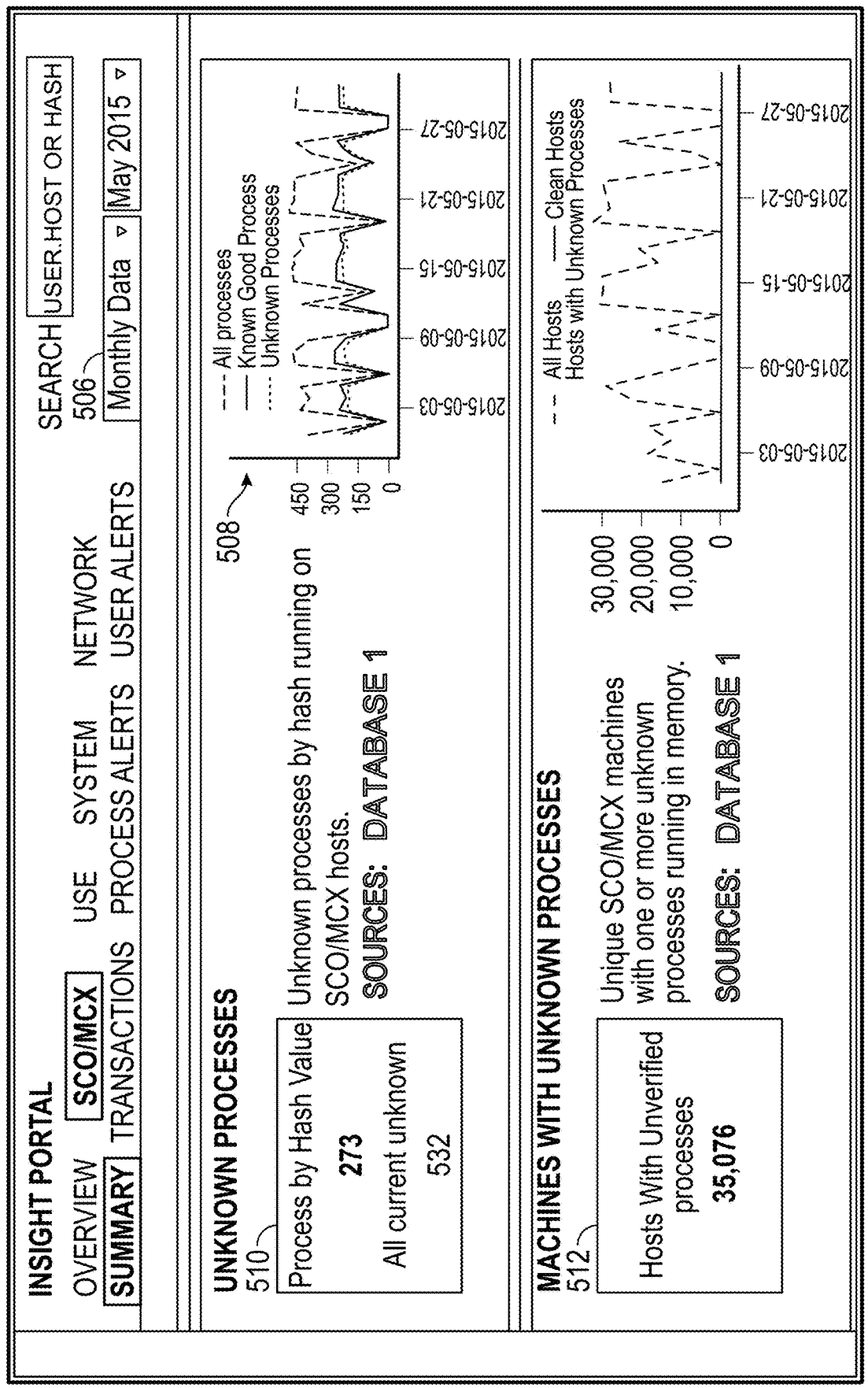
FIG. 5 illustrates an example user interface describing processes executing on checkout systems that are not known to be valid.
Figure 6:
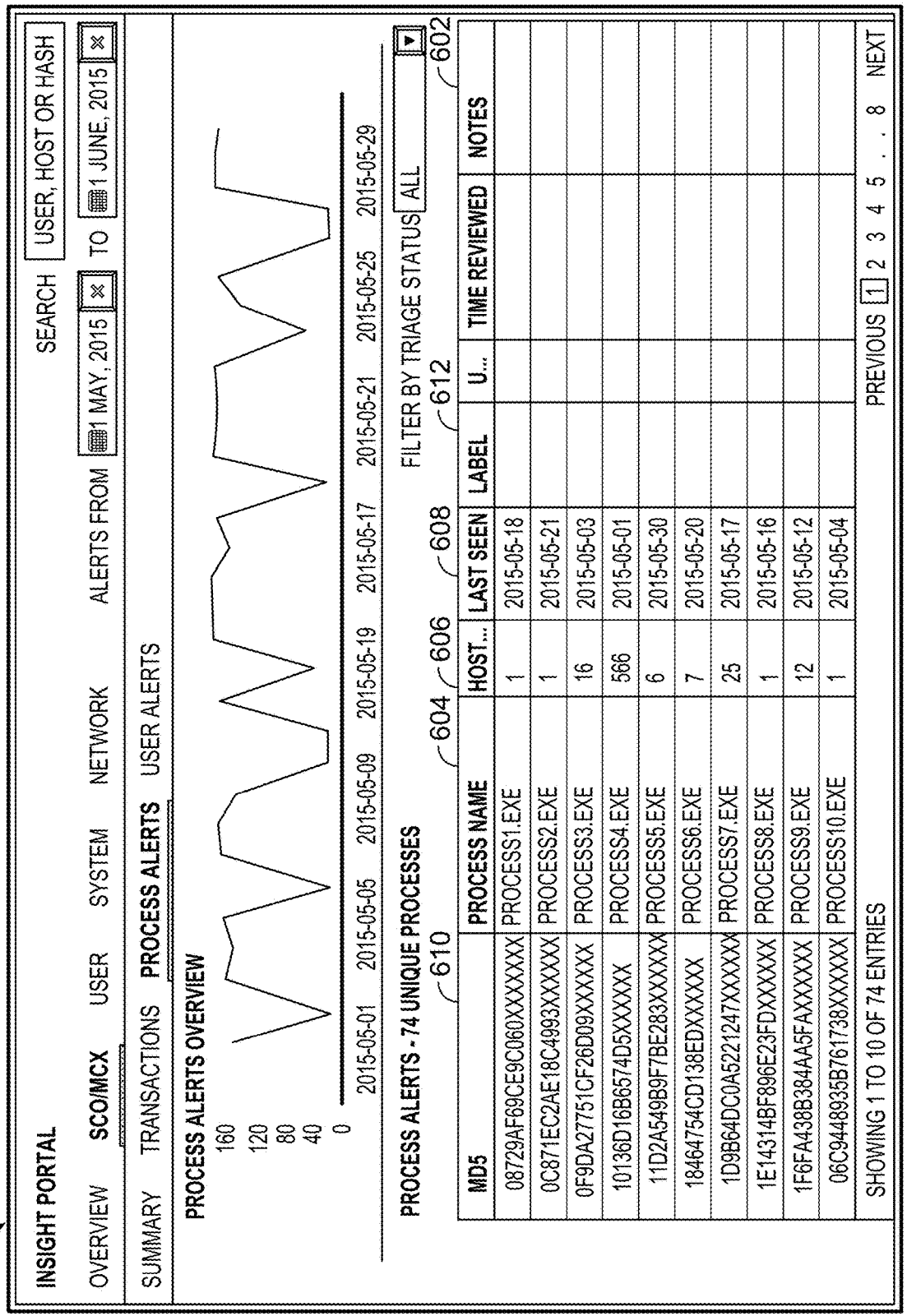
FIG. 6 illustrates an example user interface identifying processes not know to be valid.
Figure 8:
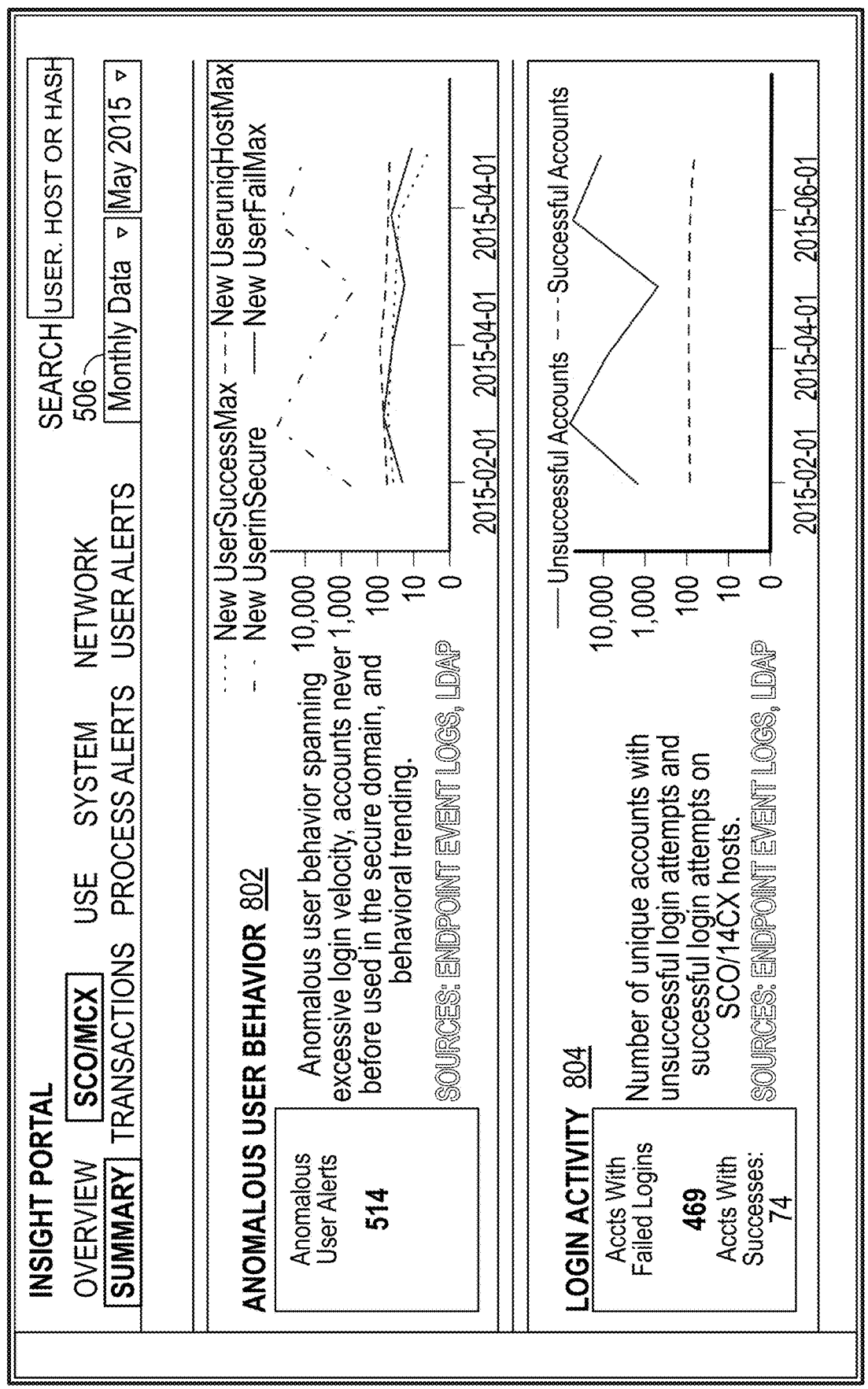
FIG. 8 illustrates an example user interface describing anomalous user behavior on checkout systems.

The compromise determination system 100 includes, or is in communication with, a presentation system 120 that provides user interface data 132 for presentation on user devices (e.g., in response to receiving a request from user device 130). The presentation system generates user interfaces to facilitate a user (e.g., a system administrator) determining whether a checkout system or user account has been compromised. The presentation system 120 can, for example, generate a user interface that presents identifications of checkout systems executing unknown processes (e.g., as illustrated in FIGS. 5-6). Similarly, the presentation system 120 can, for example, generate a user interface that presents identifications of user accounts identified as exhibiting anomalous user behavior (e.g., as illustrated in FIGS. 8-9). A user of the user device 130 can select information 134 identified in the received user interfaces (e.g., a specific process, a specific checkout system, a specific user account) and receive user interfaces identifying specific information about the selection 134. In this way, the user can receive a holistic view of the operation of the checkout systems, and quickly pivot on information that looks interesting, or suspicious (e.g., potentially malicious). User interfaces are described more fully below, with reference to FIGS. 5-12.

Figure 3:
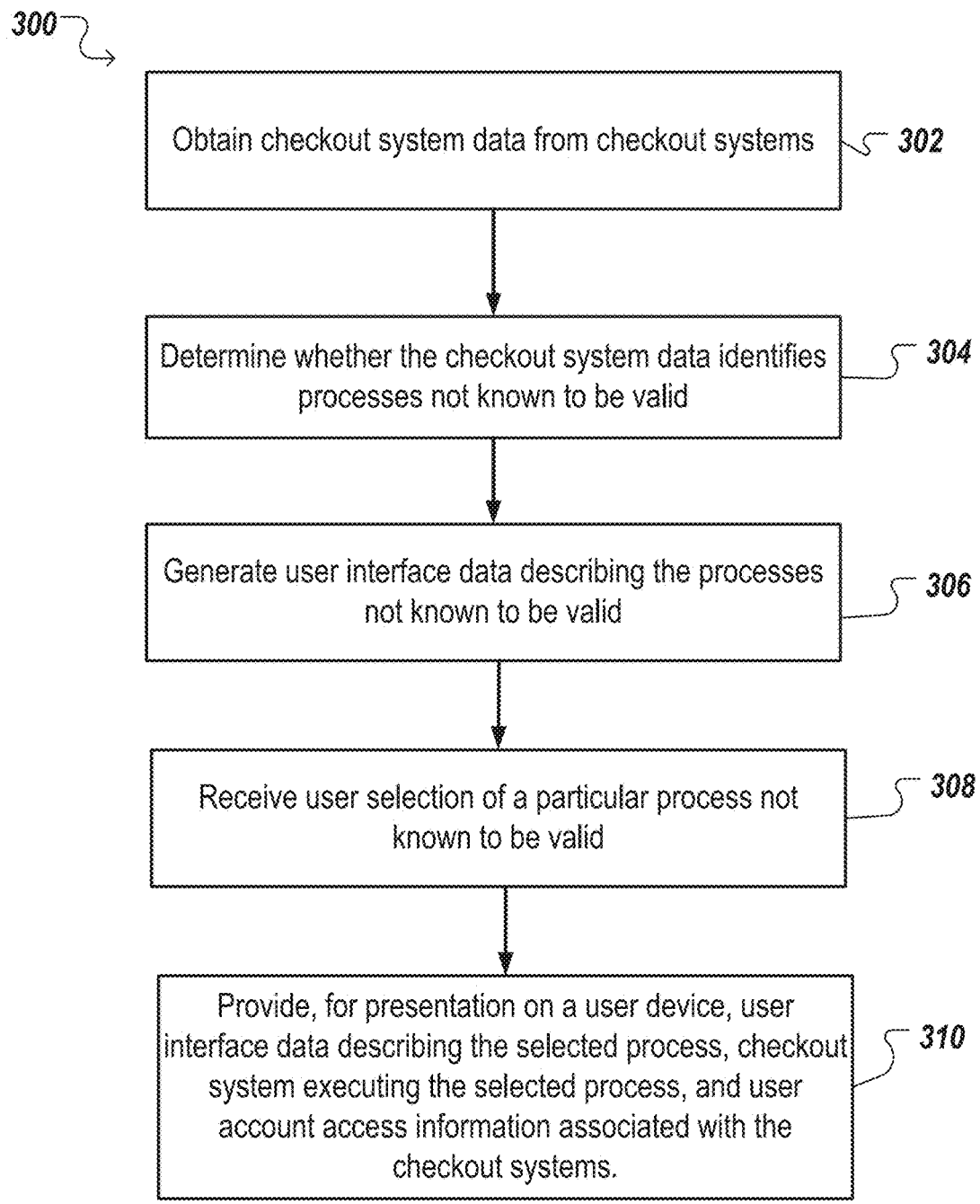
FIG. 3 is a flowchart of an example process for determining checkout systems with a risk of compromise.

FIG. 3 is a flowchart of an example process 300 for determining checkout systems associated with a risk of compromise. For convenience, the process 300 will be described as being performed by a system of one or more computers (e.g., the compromise determination system 100).

The system obtains checkout system data from checkout systems (block 302). The system can receive checkout system data (e.g., information identifying processes executing on each checkout system, information identifying binaries or other executable code resident on each checkout system, and so on) directly from each checkout system, or in some implementations, the system receives the checkout system data from an intermediary system that aggregates the checkout system data. The checkout system data is stored for processing by the system, and associated with information identifying each checkout system (e.g., particular business the checkout system is associated with, a particular store the checkout system is included in, a location in the store, and so on).

The system determines whether the checkout system data identifies processes not known to be valid (block 304). The system obtains information identifying a whitelist, which includes information describing processes identified to the system as valid. As described above, a process known to be valid is a process included for execution on a checkout system by a manufacturer of the checkout system, by a business that utilizes the checkout system, by a privileged user associated with the business, and so on.

The system compares processes identified in the obtained checkout system data to the processed identified in the whitelist. The system can compare names of the processes (e.g., a name as seen by an operating system executing on a checkout system), file locations of the processes (e.g., locations of executable code associated with the processes in a file system included in a checkout system), hashes of the processes (e.g., cryptographic hashes of executable code associated with the processes).

If the system identifies processes in the obtained checkout system data that do not compare (e.g., match) to processes identified in the whitelist, the system stores information identifying that the process is not valid, and stores information identifying checkout systems that execute any of the processes. Additionally, the system can obtain information identifying user accounts that initiated the execution of the identified processes, and store information associating the user accounts with the identified processes.

The system generates user interface data describing the determined processes not known to be valid (block 306). As will be described below, with reference to FIG. 5, the system, or a presentation system in communication with the system, generates user interface data identifying processes not known to be valid. The user interface data can include summary data identifying a total number of processes executing on the checkout systems that are not known to be valid, a total number of checkout systems executing processes that are not known to be valid, and a total number of checkout systems executing each process not known to be valid.

The generated user interface can be included in a document (e.g., a web page) configured to be received by a user device and displayed (e.g., in a web browser). A user of the user device can select information included in the user interface, such as a particular process not known to be valid, a particular checkout system, and so on. Upon selection of information, the system generates user interface data directed to information associated with the selection, as will be described below with reference to FIGS. 5-12. Optionally, the user interface, or a representation of the user interface (e.g., modified, or otherwise formatted), can be presented in an e-mail, on a mobile device, on a wearable device, and so on.

As an example of a user selection of information, the system receives a user selection of a particular process not known to be valid (block 308). A user of the user interface (e.g., a user viewing the user interface on a web browser over a network such as the Internet) can provide a selection of a particular process (e.g., the user can use a mouse, keyboard, input on a touch screen device, audio input, to select the process).

Upon selection of the particular process, the system generates user interface data identifying the particular process (block 310). The user interface can include an identification of a name of the process (e.g., a file name), an identification of a risk level of the process, a number of checkout systems that are executing the process, a total time the process has been executing (e.g., a time that the process was first identified by the system), a number of geographic regions that include checkout systems executing the process, and so on. To determine a risk level of the process, the system can provide a hash of the process (e.g., a cryptographic hash of executable code associated with the process) to an outside system storing identifications of processes known to be malicious, and receive an identification of a risk level associated with the process. Additionally, the system can receive the risk level from a user (e.g., a system administrator can input the risk level).

The user interface can further identify all checkout systems executing the process, and the user can further select a checkout system and receive a user interface identifying a location of the checkout system, user accounts that have accessed the checkout system, and so on.

Figure 4:
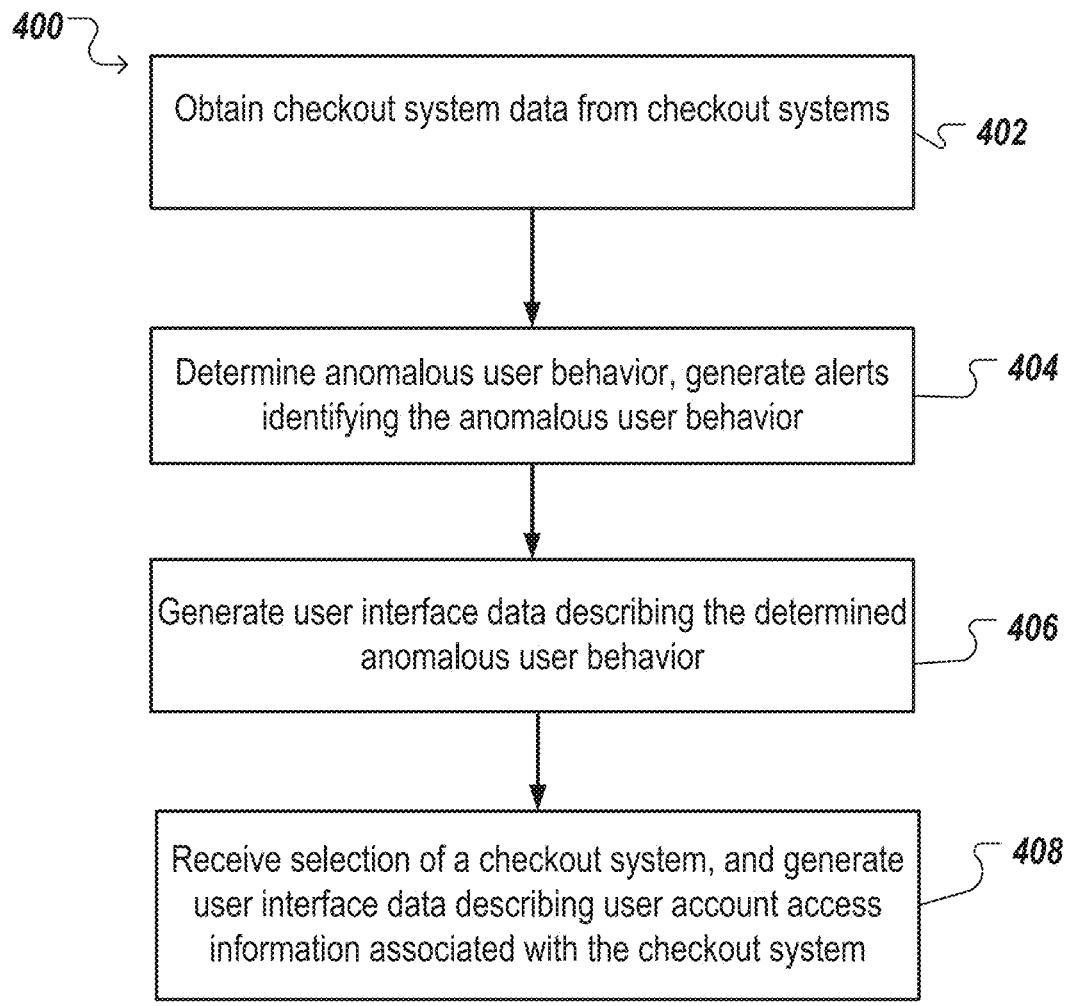
FIG. 4 is a flowchart of an example process for determining user accounts exhibiting anomalous user behavior.

FIG. 4 is a flowchart of an example process 400 for determining user accounts exhibiting anomalous user behavior. For convenience, the process 400 will be described as being performed by a system of one or more computers, e.g., the compromise determination system 100.

The system obtains checkout system data from checkout systems (block 402). As described above, with reference to FIG. 3, the system obtains checkout system data (e.g., from the checkout systems or from an intermediary system). The checkout system data can include user account access information obtained from logs generated by the checkout systems (e.g. security logs, active directory logs, and so on). In some implementations, the system can obtain user account access information from active directory information stored on servers (e.g., domain controllers) in communication with checkout systems that respond to authorization requests from user accounts. The user account access information identifies user account access attempts, and actual user account access, of checkout systems.

The system determines anomalous user behavior from the checkout system data, and generates alerts identifying the anomalous user behavior (block 404). As described above, anomalous user behavior is any behavior associated with a user account that is indicative of a risk of compromise of the user account. In some implementations, the system can test for one or more user behaviors associated with a risk of compromise, and generate alerts associated with the one or more user behaviors for later review by a user (e.g., a system administrator).

For instance, the system can determine whether a particular user account has accessed one or more checkout systems for the first time, or a threshold amount of times (e.g., 2, 3, 5), and generate an alert identifying the particular user account and affected checkout systems.

The system can determine whether a user account has accessed a checkout system from a location not known to be associated with the user account. For instance, if a user (e.g., a service technician) historically logs into a checkout system from a particular region (e.g., California), and at some point logs into the checkout system from a different region (e.g., a different country or state), the system can generate an alert identifying the user account, checkout system, and location data.

The system can determine other types of anomalous user behavior, including determining user compromise scores each indicating user behavior that indicates, at least in part, that a user account has been compromised.

For instance, the system can determine a host score for a particular user account, which is a measure associated with checkout systems the particular user account accessed. The host score can be based off a number of checkout systems an average user account accesses, and a number of systems the particular user account normally accesses. In addition to a number of checkout systems, the host score can be greater if the particular user account has recently accessed checkout systems not historically associated with the particular user account.

The speed score for a particular user account measures how likely it is that a particular user account has accessed checkout systems in disparate locations in a period of time. For instance, if the particular user account accessed a first checkout system in a first location (e.g., Austin, Tex.), and a short period of time later (e.g., 15 minutes), accessed a second checkout system in a second location (e.g., San Francisco, Calif.), the speed score can indicate that one user could not travel fast enough between those two locations (e.g., the speed score can be associated with a user-definable maximum velocity, speed, necessary to have traveled between two locations in a period of time, which can be based on historical information, and so on).

The location score for a particular user account measures risk associated with the locations from which the particular user account accessed a checkout system. For instance, a particular geographic region can be known (e.g., to a system administrator) to be associated with malicious activity. The location score can thus be greater if the checkout system is being accessed from the particular geographic region.

The system can determine other types of anomalous user behavior, for instance described in Ser. No. 14/982,699, titled "ANOMALOUS NETWORK MONITORING, USER BEHAVIOR DETECTION AND DATABASE SYSTEM," which is hereby incorporated by reference herein in its entirety for all purposes.

The system generates user interface data describing the determined anomalous user behavior (block 406). As will be described below, with reference to FIG. 8-9, the system, or a presentation system in communication with the system, generates user interface data that can summarize the determined anomalous user behavior. For instance, the summary data can include a number of user accounts associated with anomalous user behavior, summary data of specific types of alerts identifying anomalous user behavior, and so on.

In addition to presenting summary data, the system can include identifications of each user account associated with anomalous user behavior, along with checkout systems accessed by each user account, specific types of anomalous user behavior exhibited by each user account, historical information associated with each user account (e.g., previously exhibited anomalous user behavior), and so on.

A user of the user interface (e.g., a system administrator) can select a user account, and the system can generate a user interface identifying user profile data associated with the selected user account (e.g., identifying an employee role associated with the user account, access rights of the user account, geographic region of the employee, and so on.)

Additionally, as an example, the system can receive a selection of a checkout system and the system can generate a user interface describing user account access information associated with the checkout system (block 408). For instance, the generated user interface can identify a location of the checkout system, a number of user accounts that attempted to access the checkout system (e.g., within a particular time period), a number of access attempts that resulted in a failed log-in, types of anomalous user behavior associated with user accounts that attempted to access, or accessed, the checkout system. An example of such a user interface is described below, with reference to FIG. 10. In some implementations, the system can also include process information, (e.g., processes not know to be valid described above with reference to FIG. 3), associated with the selected checkout system in the user interface (e.g., illustrated in FIG. 10).

User Interfaces

User interfaces described in FIGS. 5-12 are examples of interactive user interfaces generated by the system, or a presentation system in communication with the system, and presented on a user device. In some implementations, the user interfaces can be presented on the user device as a document (e.g., a web page) in an application (e.g., a web browser).

Each of the user interfaces described below includes user selectable options that upon selection can cause the system to obtain associated information (e.g., from databases 102, 104, 108), determine updated information, and modify, or generate, user interface data. The user interfaces can provide a reviewing user (e.g., a system administrator, a security officer, a service technician) insights into complex networks with large numbers of checkout systems and user accounts, by obtaining disparate information spread across checkout systems, and providing easy to understand summary data for a reviewing user.

Each example user interface described below includes a selectable option for the reviewing user to specify a particular time range that interests him/her. Upon receiving a selected time range, the system can access one or more databases (e.g., databases 102, 104, 108) and determine information associated with the time range to provide to the reviewing user.

FIG. 5 illustrates an example user interface 500 describing processes executing on checkout systems that are not known to be valid. The user interface 500 can be displayed on a user device, and in some implementations can be a document (e.g., a web page) configured to be received over a network (e.g., a local area network, the Internet) and displayed on the user device (e.g., in a web browser).

In the illustration of FIG. 5, a user of the user interface (e.g., a system administrator monitoring checkout systems deployed across a business) has selected a selectable option 502 identifying that he/she wants to view "SCO/MCX" information, which identifies checkout system information. Additionally, the user has selected "Summary" data 504, identifying that he/she wants to view an overview of the checkout systems, including processes not known to be valid. The "Summary" data 504 user interface can further include information regarding anomalous user behavior, which is described below with reference to FIG. 8.

The user interface 500 includes user selectable options including a time window 506 (e.g., a date range), which the user can set to view process information associated with the time window 506. As illustrated in FIG. 5, the time window 506 is set to "May 2015", and the graphs 508, as illustrated, include information from the selected time window 506.

The user interface 500 includes summary data, including a number of processes not know to be valid 510, which in the example of FIG. 5 is "273", and a number of checkout systems 512 executing processes not known to be valid, which in the example is "35,076". As described in the user interface 500, the number "273" is based off hash comparisons (e.g., as described above with reference to FIG. 3), however in some implementations the number can include process name comparisons, process location comparisons, or a combination.

FIG. 6 illustrates an example user interface 600 identifying processes not know to be valid. The user interface 600 can be provided for presentation on a user device, upon user selection of "Process Alerts", in contrast to "Summary" data as described above in FIG. 5. The "Process Alerts" selection provides detailed information regarding processes executing on checkout systems that are not known to be valid.

In this way, a user (e.g., a system administrator), can view an overall summary of the checkout systems, and then view identifications of the specific processes not known to be valid. For instance, if a system administrator is located in a particular region, he/she might want to view information identifying processes not know to be valid that are executing on checkout systems in his/her region. The user can select a selectable filter 602 to filter by region, and view processes executing on checkout systems located in the region.

The user interface 600 includes identifications of processes not known to be valid 604, a number of checkout systems ("hosts") 606 that execute each process, a time the process was last determined to be executing 608, and a hash of the process (e.g., a cryptographic hash of executable code associated with the process) 610. Additionally, the user interface 600 is configured to receive labels 612, notes, a time reviewed, and other descriptive text from a user (e.g., a system administrator). In this way, the user can keep track of processes that he/she has reviewed, or has yet to review.

FIG. 7 illustrates an example user interface 700 displayed upon selection of a particular process not known to be valid. The selected process with filename 702 "example.exe" and hash 704 (e.g., MD5 hash) "1D9B64DC0A5221247208F8XXXX12345", was selected by a user from the user interface 600, described above in FIG. 6.

After selection of the process, user interface 700 is generated with information identifying the process (e.g., file name, hash), and an associated risk level 706 of the process. The risk level 706 can be determined by the system (e.g., the compromise determination system 100) by providing a hash of the process to an outside system, and receiving an identification of the risk level 706. In some implementations, the risk level 706 can be determined by the system after determining the effects of the process (e.g., through monitoring of the processes actions in an operating system executing on a checkout system). For instance, if the process is determined to be monitoring payment instruments used by consumers (e.g., skimming credit card numbers), the process can be identified as having a "Critical" risk level. Additionally, a user (e.g., a system administrator) can input a risk level 706 for the process, and if the process is determined to be executing on a checkout system at a later point, the system can automatically apply the risk level 706. Optionally, the risk level can be obtained through searching a hash value associated with the process (e.g., searching the common vulnerability scoring system, and other outside systems and databases).

The user interface 700 includes a portion in which a user (e.g., a system administrator) can include descriptive text 708 identifying the reviewing user, checkout systems he/she has investigated and/or fixed to remove the process, a time the user took an actions, and any notes the user desires to include (e.g., so other users can view the notes if the process is determined to be executing at a later point in time).

The user interface 700 further includes summary data regarding the process, including a total number of times the process has been determined to be executing 710, a total number 712 of checkout systems executing the process (e.g., within a particular user selectable time period), a total number 714 of file locations executable code associated with the process have been found in, a number of regions 716 (e.g., user selectable areas or other identifiers of regions) that checkout systems executing the process are location in, and a total time 718 (e.g., number of days as illustrated) the process has been determined to be executing.

Each portion of summary data (e.g., 710-718) can be selectable by a user, and upon selection, details 720 regarding the selection can be presented.

For instance, upon selection of portion 710, the user interface 700 can present historical information regarding the process (e.g., checkout systems affected, regions in which the process was determined to be executing).

Upon selection of portion 712, the user interface 700 can present an identification of the checkout systems presently affected, and the user can select the checkout system to view information associated with the checkout system (e.g., processes executing on the checkout system, a location of the checkout system, user accounts with access rights to the checkout system, and so on).

Upon selection of portion 714, the specific location of executable code associated with the process can be presented. If more than location is detected (e.g., on a single checkout system, or across different checkout systems), the locations can be presented along with identifications of respective checkout systems.

Upon selection of portion 716, identifications of regions which include checkout systems executing the process are presented. For instance, a map of a region (e.g., a country, a state, a province, a city) can be presented along with information indicating density of locations of the affected checkout systems (e.g., a heat map).

Upon selection of portion 718, information identifying a spread of the process executing on disparate checkout systems can be presented. That is, the user interface 700 can display (e.g., chart or graph) a rise of the process executing on disparate checkout systems, including associated information such as location or region of each checkout system, and user accounts that initiated the execution of the process.

FIG. 8 illustrates an example user interface 800 describing anomalous user behavior on checkout systems. As described above, in FIG. 5, a user of the user interface 800 (e.g., a system administrator monitoring the checkout systems deployed across a business) can selected an option identifying that he/she wants to view "Summary" data regarding anomalous user behavior of checkout systems.

The user interface 800 includes user selectable options including a time window (e.g., a date range), which the user can set to view summary data associated with the time window. As illustrated in FIG. 8, the time window is set to "May 2015", and the graphs, as illustrated, include information from the selected time window.

The summary data includes an identification of a number of alerts 802 generated by the system (e.g., the compromise determination system 100), with each alert identifying particular anomalous use behavior. In the example of FIG. 8, the user interface 800 identifies that "514" anomalous user alerts have been generated 802, and includes descriptive text regarding anomalous user behavior, "Anomalous user behavior spanning excessive login velocity, accounts never before used in the secure domain, and behavioral trending."

In some implementations, portion 802 can be selected by the user, and upon selection, the user interface 800 can be updated to present identifications of each of the generated alerts (e.g., described below with reference to FIG. 9).

Additionally, the summary data includes an identification of a total number of user accounts with unsuccessful log-in attempts and successful log-in attempts 804. A user of the user interface 800 (e.g., a system administrator) can monitor the number of unsuccessful log-in attempts to determine whether a malicious actor is attempting to access a user account (e.g., through a brute-force attack, a dictionary based password attack, and so on). Similar to the above description of alerts, alerts can be generated based on particular thresholds being met or satisfied, for instance a threshold associated with a number of unsuccessful log-in attempts (e.g., a total amount over a period of time), or alerts can be generated based on a change in a volume of attempts over a period of time (e.g., the volume can be scaled, and percent increases can be determined over time, over a period of time, over respective periods of time, and so on). The system can actively monitor and determine information associated with generating alerts, such as various quantities including a number of unsuccessful log-in attempts quantities of processes not known to be valid, numbers of checkout systems executing processes not known to be valid, and so on, and can trigger notifications to be provided to, for instance, a user device or system for review. That is, the user device can execute an application in communication with the system (e.g., a specific application associated with checkout system monitoring), and the system can trigger the user device to present information describing the particular user account. Additional notifications can include e-mails, SMS, MMS, texts, phone call, and so on. In this way, the system can ensure that time-sensitive information associated with user accounts and/or checkout systems timely reaches an intended user (e.g., by activating an associated user device).

Similarly to portion 802, portion 804 can be selectable by the user, and upon selection, the user interface 800 can be updated to present identifications of checkout systems and respective numbers of unsuccessful/successful log-ins. Additionally, the user interface 800 can present a rate of change (e.g., a first and/or second derivative) of the number of log-in attempts, to determine a time period an attack on a checkout system took place.

FIG. 9 illustrates an example user interface 900 identifying user accounts and associated alerts identifying anomalous user behavior. The user interface 900 can be provided for presentation on a user device upon user selection of "User Alerts", in contrast to "Summary" data as described above in FIG. 8. The "User Alerts" selection provides detailed information regarding user accounts and associated anomalous user behavior.

A user of the user interface 900 (e.g., a system administrator) can utilize the user interface 900 to quickly view all generated alerts associated with anomalous user behavior. The user interface 900 includes a list of user accounts 902, and associated information including checkout systems the user account accessed 904, a type of anomalous user behavior alert 906, areas the user can input information 908 regarding a status of review of the user account, a time the alert was triggered 910 (e.g., a day), and historical information associated with the alert 912.

As an example of historical information 912, for an alert (e.g., "NewUserInSecure") identifying a user account that has never accessed a specific checkout system, the associated historical information 912 can identify a number of checkout systems the user account has accessed in the past, particular regions the user account is associated with, and so on.

As another example of historical information 912, an alert (e.g., "NewUserSuccessMax") can identify that a user account has accessed greater than a threshold number of checkout systems in a period of time. The associated historical information 912 can identify a number of checkout systems the user account normally (e.g., a measure of central tendency) accesses in the period of time.

Each portion of information (e.g., 902-912) is configured to be selectable by the user, and the user interface 900 can be updated to provide information regarding the selection.

For instance, the user can select a specific user account 902, and the user interface 900 can be updated to provide information associated with the user account. The information can include a role of an employee associated with the user account, specific access rights associated with the user account, a region or location the employee is located in, regions the user account has accessed, checkout systems the user account has accessed or routinely (e.g., greater than a threshold number of times, or greater than a threshold frequency) accesses.

The user can select a specific checkout system 904, and the user interface 900 can be updated to provide information associated with the checkout system, which is described below with reference to FIG. 10.

The user can select a specific type of alert 906, and the user interface 900 can be updated to provide information solely regarding the type of alert. For instance, the user interface 900 can be updated to present all user accounts and respective checkout systems associated with the type of alert, descriptive text associated with the alert, previous alerts of the same type that were generated and dealt with by a user (e.g., a system administrator), and so on.

Figure 10:
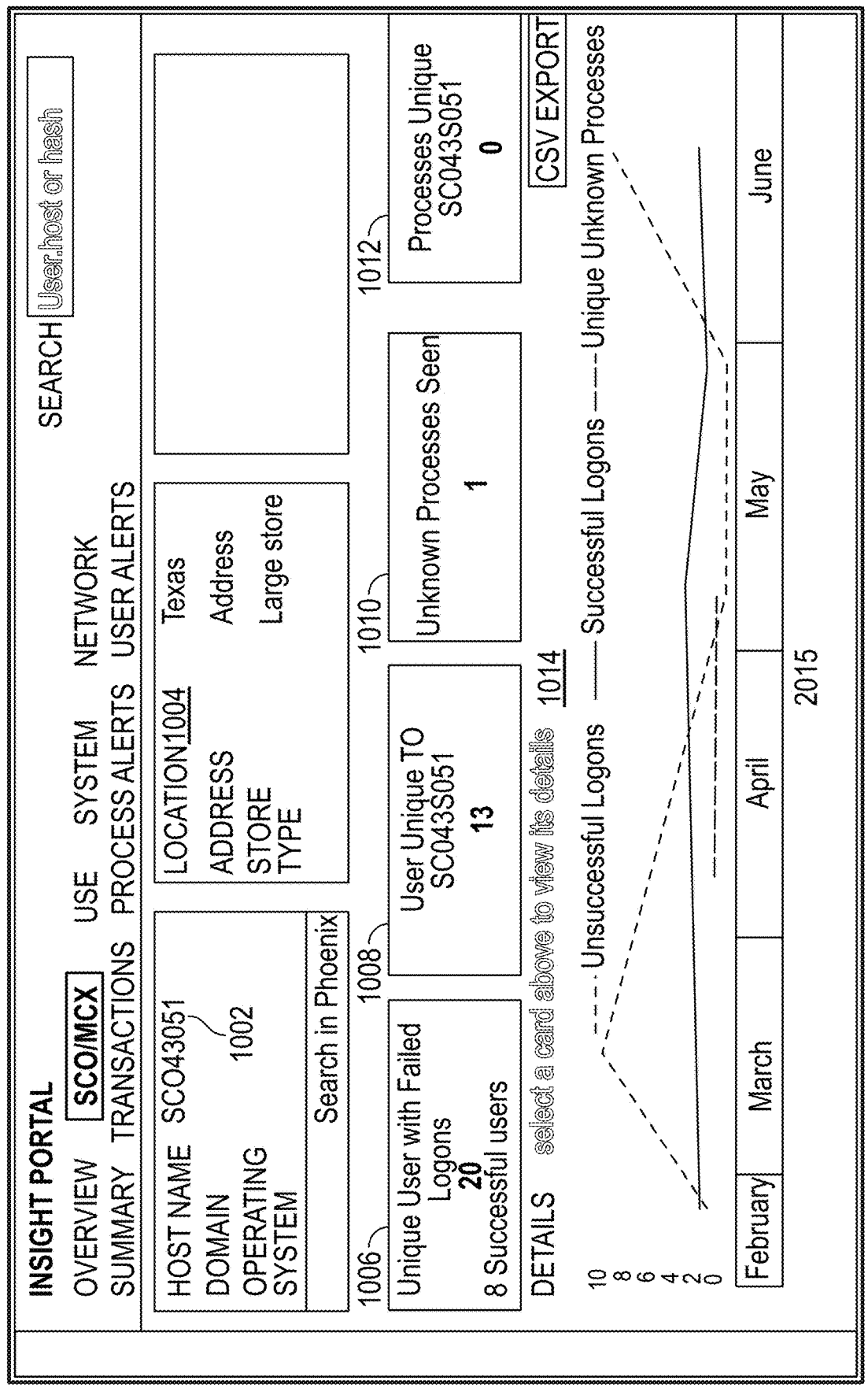
FIG. 10 illustrates a user interface after a user selection of a particular checkout system.

FIG. 10 illustrates a user interface 1000 after a user selection of a particular checkout system. The user interface 1000 can be provided after a user (e.g., a system administrator) selects the particular checkout system from the user interface described in FIG. 9. For instance, the user can view an anomalous user behavior alert, and want to view specific information associated with the checkout system.

The user interface 1000 includes an identification of the selected checkout system 1002, including a network domain and operating system associated with the selected checkout system 1002. Additionally, the user interface 1000 includes a location 1004 of the checkout system, which in the example of FIG. 10 is "Texas" and a type of store, e.g., "Large Store."

The user interface 1000 further includes summary data associated with the checkout system 1002, including a number 1006 of unique user accounts that failed to successfully log into the checkout system 1002, a number 1008 of user accounts that are unique to the checkout system 1002 (e.g., a number of user accounts that have successfully accessed the checkout system, a number of user accounts that have access rights to the checkout system, or a number of user accounts that solely have access rights to the checkout system).

In addition to user account access information, the user interface 1000 includes process information, such as a number 1010 of processes not known to be valid that are executing on the checkout system 1002, and a number of processes 1012 that are only executing on the checkout system 1012 (e.g., a process unique to a particular checkout system might indicate a malicious process).

Each portion of summary data (e.g., portions 1006-1012) can be configured to be user selectable. For example, upon user selection of portion 1006, the user interface 1000 can be updated to view graph 1014, identifying historical information regarding numbers of unsuccessful and successful log-ins to the checkout system.

Upon user selection of portion 1008, the user interface 1000 can be updated to present historical data regarding user accounts unique to the checkout system, and/or identifications of user accounts presently unique to the checkout system. In this way, the user (e.g., system administrator), can quickly identify if the number of user accounts has risen suddenly (e.g., indicating a user escalated his/her access rights or created a new user account with access rights), or identify if the number of user accounts is growing for no specific business reason (e.g., increasing the likelihood that a user account can be compromised). Additionally, the user can compare the historical information to time periods that unknown processes 1010 began execution, or identify when a user account suddenly had access to a checkout system, and see if the user account initiated a process not known to be valid. In this way, the user can quickly determine whether the user account has been compromised.

Upon user selection of portion 1010, the user interface 1000 can be updated to present identifications of the processes executing, or previously executing, on the checkout system 1002 that are not known to be valid. Each identification can be selected, and the user interface can be updated to describe the selected process, as described above with reference to FIG. 7. Similarly, upon user selection of portion 1012, the user interface 1000 can be updated to present processes solely executing on the checkout system.

Figure 11:
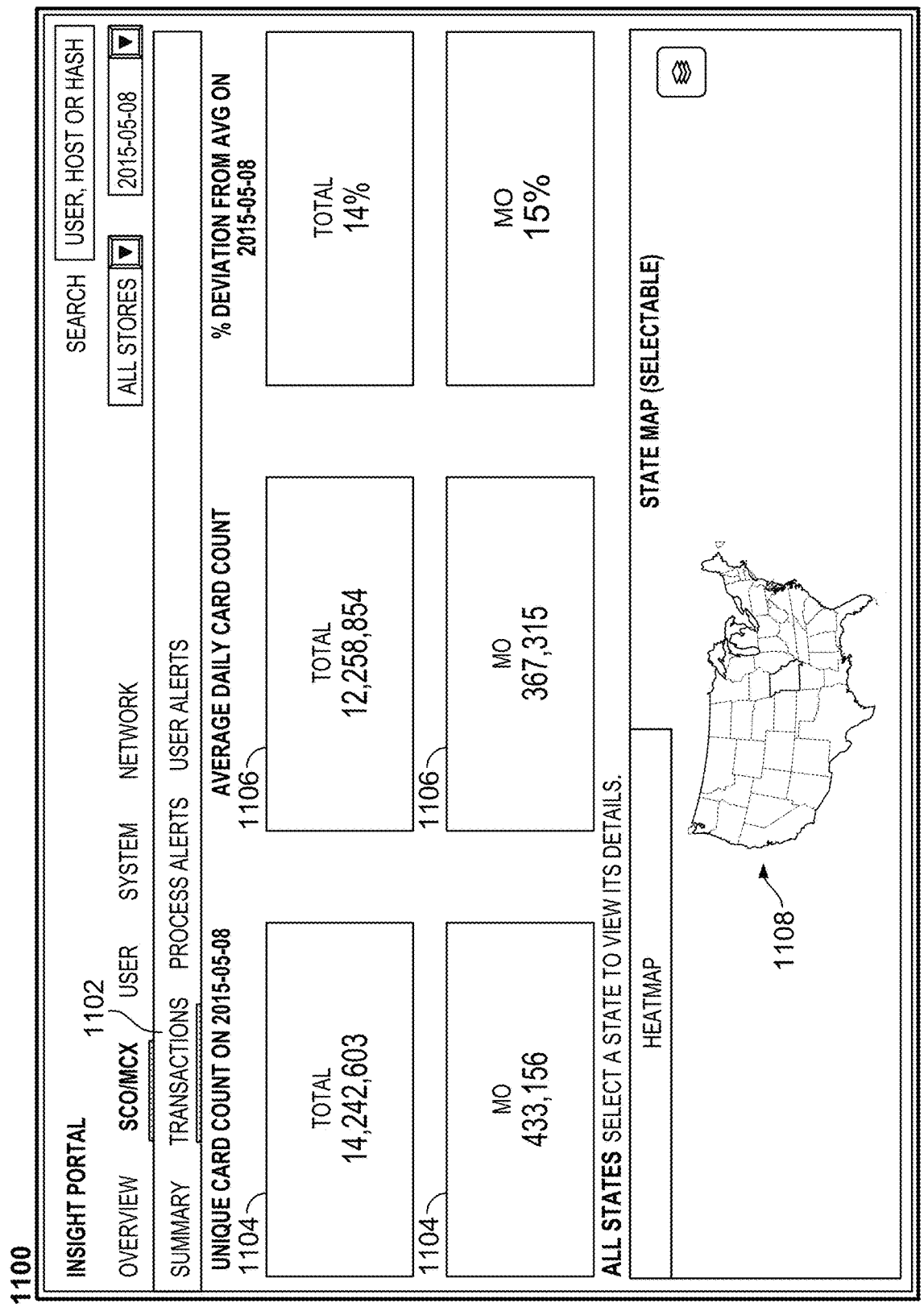
FIG. 11 illustrates an example user interface describing transaction data.

FIG. 11 illustrates an example user interface 1100 describing transaction data. The user interface 1100 can be presented upon user selection of the "Transactions" identifier 1102.

The user interface 1100 includes identifications of a number 1104 of unique payment instruments (e.g., credit cards as illustrated in the example) across all locations in a business, or in a particular region (e.g., a state such as Montana). Additionally, the user interface 1100 includes an average (e.g., a measure of central tendency) number 1106 of payment instruments for a time period (e.g., a day), and for a particular region (e.g., Montana).

A user can select a different region (e.g., using a map) and view transaction data associated with the region. Additionally, a heatmap 1108 can be presented, describing numbers of payment instruments processed according to region.

Figure 12:
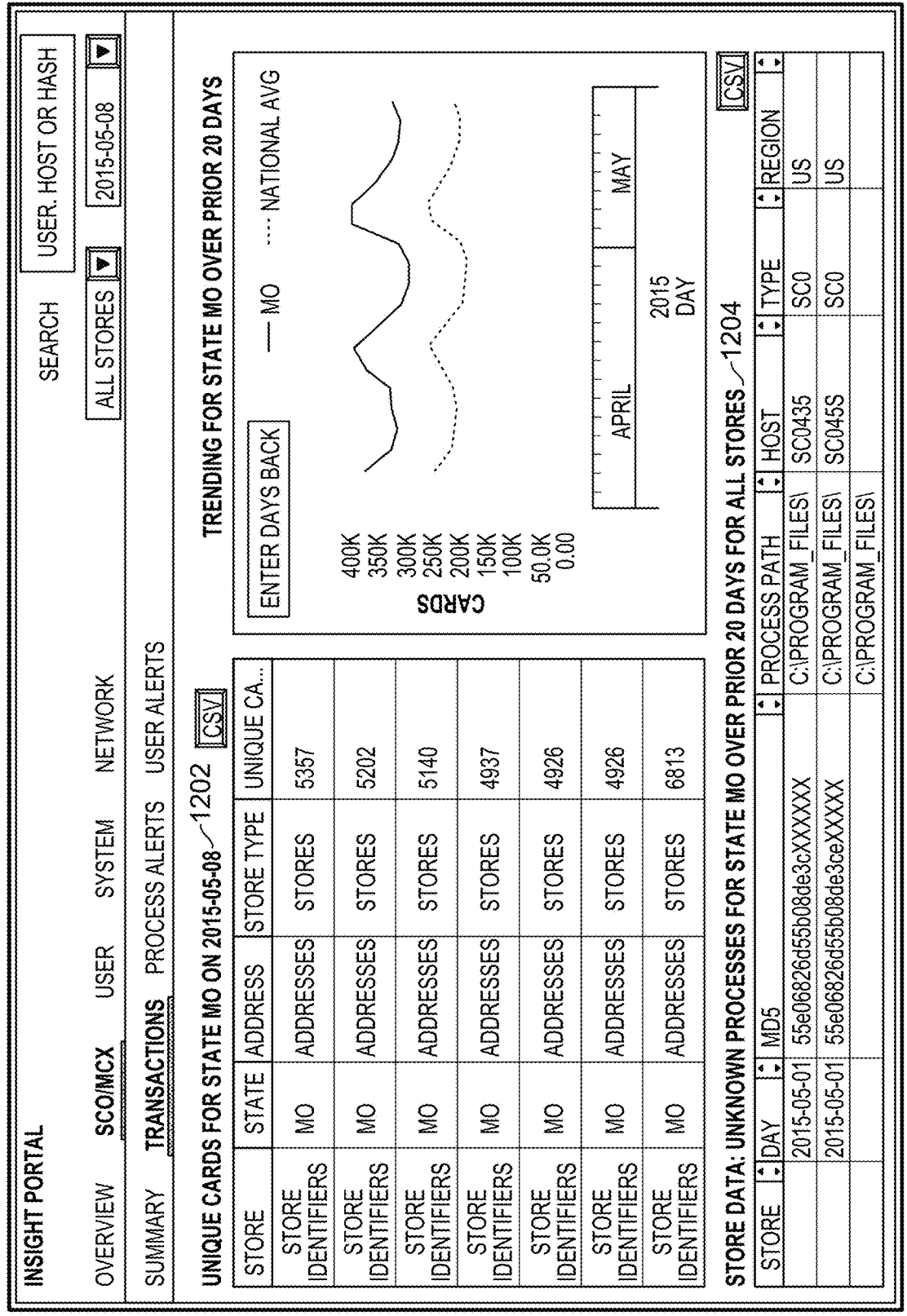
FIG. 12 illustrates an example user interface describing detailed information regarding transaction data in a particular region.

FIG. 12 illustrates an example user interface 1200 describing detailed information regarding transaction data in a particular region. The user interface 1200 includes identifications 1202 of locations (e.g., stores) associated with a business in a particular geographic region (e.g., Montana), and associated number of unique payment instruments. Additionally, the user interface 1200 includes identifications 1204 of processes not known to be valid that are executing on checkout systems included in locations identified in 1202.

ADDITIONAL EMBODIMENTS

A system administrator can utilize the system (e.g., the compromise determination system 100) to determine that credit cards, utilized at a business, were compromised, and alert the affected consumers, or alert associated credit companies that can alert the affected consumers.

The system administrator can identify credit card numbers listed on web pages known to sell, or distribute, compromised credit cards. For instance, web pages that sell compromised credit cards can list a portion of information identified on each credit card, such as the first several numbers (e.g., 4, 6) numbers of a credit card, the last several numbers (e.g., 2, 4), expiration date, and so on.

The system administrator can obtain the portions of credit card numbers, and compare the numbers to transaction data stored by the system (e.g., transaction data from particular locations of the business). Upon a threshold percentage match (e.g., 70%, 80%, 90%), the system administrator can determine that the credit cards were obtained by a malicious actor from the locations.

Using the system, the system administrator can then determine when the credit cards were utilized at the locations, and the specific checkout systems utilized. The system administrator can determine whether any processes not known to be valid were executing on the checkout systems, and anomalous user behavior associated with the checkout systems. In this way, the system administrator can determine the method in which the checkout systems were modified by a malicious actor, and alert other consumers that could be affected (e.g., consumers that utilized the affected checkout systems).

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the compromise determination system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method comprising:
    by a system of one or more computer systems,
    aggregating indications of processes executing in memory of disparate computing systems, the computing systems being configured to access sensitive information, wherein the sensitive information represents transactions associated with payment instruments;
    determining that one or more processes are not authorized to access the sensitive information, wherein a first process of the determined processes is determined to be monitoring payment instruments; and
    causing presentation, via an interactive user interface, of information summarizing the determined processes and information summarizing computing systems executing the determined processes, wherein the interactive user interface enables generation of one or more alerts associated with payment instruments determined to be monitored by the first process, and wherein the interactive user interface:
        presents summary information associated with processes executing on the computing systems that are not authorized to access the sensitive information, wherein the summary information comprises a graphical depiction of a measure associated with the processes,
        presents summary information associated with checkout systems executing processes that are not authorized to access the sensitive information, wherein the summary information comprises a graphical depiction of a measure associated with the checkout systems, and
        responds to user input associated with the alerts, wherein the interactive user interface triggers determination as to a risk level associated with the first process based on a hash associated with the first process, and wherein in response to user input the interactive user interface is configured to present detailed information associated with the first process.

2. The method of claim 1, wherein the processes are associated with respective executable code on the computing systems.

3. The method of claim 1, wherein aggregating indications of processes is based on information obtained from respective agents executing on the computing systems, the agents monitoring processes executing in memory.

4. The method of claim 1, wherein determining that the first process is not authorized to access the sensitive information comprises:
    comparing a name associated with the first process with one or more names of processes authorized to access the sensitive information; or
    comparing a file location of executable code associated with the first process with one or more file locations of executable code associated with processes authorized to access the sensitive information; or
    comparing a cryptographic hash of executable code associated with the first process with cryptographic hashes of executable code associated with processes authorized to access the sensitive information.

5. The method of claim 1, wherein the method further comprises:
    obtaining information identifying a set of payment instruments known to be compromised;
    comparing the set of payment instruments to payment instruments associated with transactions; and
    updating the interactive user interface to present indications of computing systems which accessed the payment instruments.

6. The method of claim 5, wherein the interactive user interface is configured to present indications of particular processes executing on the computing systems indicated in the interactive user interface, the particular processes not being authorized to access the sensitive information.

7. The method of claim 1, wherein the interactive user interface:
    responds to selection of a particular process executing on one or more computing systems;
    triggers determination as to a risk level associated with the particular process based on a hash associated with the particular process; and
    in response to user input, presents information describing a heat map associated with affected checkout systems.

8. A computing system comprising one or more hardware processors and computer storage media storing instructions that when executed by the one or more hardware processors, cause the one or more hardware processors to perform operations comprising:
    aggregating indications of processes executing in memory of disparate computing systems, the computing systems being configured to access sensitive information, wherein the sensitive information represents transactions associated with payment instruments;
    determining that one or more processes are not authorized to access the sensitive information, wherein a first process of the determined processes is determined to be monitoring payment instruments; and
    causing presentation, via an interactive user interface, of information summarizing the determined processes and information summarizing computing systems executing the determined processes, wherein the interactive user interface enables generation of one or more alerts associated with payment instruments determined to be monitored by the first process, and wherein the interactive user interface:
        presents summary information associated with processes executing on the computing systems that are not authorized to access the sensitive information, wherein the summary information comprises a graphical depiction of a measure associated with the processes,
        presents summary information associated with checkout systems executing processes that are not authorized to access the sensitive information, wherein the summary information comprises a graphical depiction of a measure associated with the checkout systems, and responds to user input associated with the alerts, wherein the interactive user interface triggers determination as to a risk level associated with the first process based on a hash associated with the first process, and wherein in response to user input the interactive user interface is configured to present detailed information associated with the first process.

9. The computing system of claim 8, wherein the processes are associated with respective executable code on the computing systems.

10. The computing system of claim 8, wherein aggregating indications of processes is based on information obtained from respective agents executing on the computing systems, the agents monitoring processes executing in memory.

11. The computing system of claim 8, wherein determining that the first process is not authorized to access the sensitive information comprises:
comparing a name associated with the first process with one or more names of processes authorized to access the sensitive information; or
comparing a file location of executable code associated with the first process with one or more file locations of executable code associated with processes authorized to access the sensitive information; or
comparing a cryptographic hash of executable code associated with the first process with cryptographic hashes of executable code associated with processes authorized to access the sensitive information.

12. The computing system of claim 8, wherein the operations further comprise:
obtaining information identifying a set of payment instruments known to be compromised;
comparing the set of payment instruments to payment instruments associated with transactions; and
updating the interactive user interface to present indications of computing systems which accessed the payment instruments.

13. The computing system of claim 12, wherein the interactive user interface is configured to present indications of particular processes executing on the computing systems indicated in the interactive user interface, the particular processes not being authorized to access the sensitive information.

14. The computing system of claim 8, wherein the interactive user interface:
responds to selection of a particular process executing on one or more computing systems;
triggers determination as to a risk level associated with the particular process based on a hash associated with the particular process; and
in response to user input, presents information describing a heat map associated with affected checkout systems.

15. Non-transitory computer storage media storing instructions that when executed by a system of one or more processors, cause the system to perform operations comprising:
aggregating indications of processes executing in memory of disparate computing systems, the computing systems being configured to access sensitive information, wherein the sensitive information represents transactions associated with payment instruments;
determining that one or more processes are not authorized to access the sensitive information, wherein a first process of the determined processes is determined to be monitoring payment instruments; and
causing presentation, via an interactive user interface, of information summarizing the determined processes and information summarizing computing systems executing the determined processes, wherein the interactive user interface enables generation of one or more alerts associated with payment instruments determined to be monitored by the first process, and wherein the interactive user interface:
presents summary information associated with processes executing on the computing systems that are not authorized to access the sensitive information, wherein the summary information comprises a graphical depiction of a measure associated with the processes,
presents summary information associated with checkout systems executing processes that are not authorized to access the sensitive information, wherein the summary information comprises a graphical depiction of a measure associated with the checkout systems, and
responds to user input associated with the alerts, wherein the interactive user interface triggers determination as to a risk level associated with the first process based on a hash associated with the first process, and wherein in response to user input the interactive user interface is configured to present detailed information associated with the first process.

16. The computer storage media of claim 15, wherein the processes are associated with respective executable code on the computing systems.

17. The computer storage media of claim 15, wherein aggregating indications of processes is based on information obtained from respective agents executing on the computing systems, the agents monitoring processes executing in memory.

18. The computer storage media of claim 15, wherein determining that first process is not authorized to access the sensitive information comprises:
comparing a name associated with the first process with one or more names of processes authorized to access the sensitive information; or
comparing a file location of executable code associated with the first process with one or more file locations of executable code associated with processes authorized to access the sensitive information; or
comparing a cryptographic hash of executable code associated with the first process with cryptographic hashes of executable code associated with processes authorized to access the sensitive information.

19. The computer storage media of claim 15, wherein the operations further comprise:
obtaining information identifying a set of payment instruments known to be compromised;
comparing the set of payment instruments to payment instruments associated with transactions; and
updating the interactive user interface to present indications of computing systems which accessed the payment instruments.

20. The computer storage media of claim 19, wherein the interactive user interface is configured to present indications of particular processes executing on the computing systems indicated in the interactive user interface, the particular processes not being authorized to access the sensitive information.

\* \* \* \* \*